Aug. 24, 1965 D. C. J. MAGOTTEAUX 3,202,975

PHASE MODULATED PULSE RECORDING AND READING SYSTEMS

Filed March 19, 1962 3 Sheets-Sheet 1

Inventor
DESIRE C. J. MAGOTTEAUX
By [signature]
Attorney

Inventor
DESIRE C. J. MAGOTTEAUX
By [signature]
Attorney

PHASE MODULATED PULSE RECORDING AND READING SYSTEMS

Filed March 19, 1962

3 Sheets-Sheet 3

Inventor
DESIRE C. J. MAGOTTEAUX
By
Attorney 3,202,975
Patented Aug. 24, 1965

3,202,975
PHASE MODULATED PULSE RECORDING AND READING SYSTEMS

Désiré Camille Joseph Magotteaux, Antwerp, Belgium, assignor to International Standard Electric Corporation, New York, N.Y., a corporation of Delaware Filed Mar. 19, 1962, Ser. No. 180,705
Claims priority, application Netherlands, Mar. 24, 1961, 262,775
6 Claims. (Cl. 340—174.1)

The present invention relates to a pulse code conversion circuit for use with phase modulation recording and reading apparatus and more particularly to a pulse code conversion circuit for converting a first two-level information waveform (A), varying between a first or 0-level representing a binary 0 and a second or 1-level representing a binary 1, into a phase modulated waveform, wherein the level changes in one sense; i.e. from said first level to said second level; of said first information waveform, occur in synchronism with the level changes in the same sense of a first synchronizing waveform (B), whereas the level changes in the other sense, i.e. from said second level to said first level, of said first information waveform occur in synchronism with the level changes in the same sense of a second synchronizing waveform (B′) which is the inverse of said first synchronizing waveform, and wherein a logical circuit ($LC_1$) is provided for transforming said information waveform into said phase modulated waveform by realizing the Boolean function $AB+A'B'$, wherein A′ is a second two-level information waveform which is the inverse of said first information waveform.

Such a code conversion circuit is already known from the U.S. Patent No. 2,853,357. This known circuit has the disadvantage that spurious signals may appear at the outputs of the two coincidence gates through which the respective products AB and A′B′ are derived, and thus at the output of the mixer which produces the sum $AB+A'B'$. Indeed, considering the above coincidence gates, it is clear that spurious signals may appear in coincidence with those variations of the information waveforms A and A′ which are in a sense opposite to the concurrent variations of the respective waveforms B and B′.

Obviously such spurious signals will appear at the output of the above mixer. Besides the latter spurious signals, other spurious signals may appear in the resulting phase modulated waveform, generated at the output of the mixer, in coincidence with the variations of the information waveforms A and A′ in the opposite sense relative to the waveforms B and B′ since the associated product waveforms AB and A′B′ appearing at the outputs of the above two coincidence gates will then be varying in opposite senses.

The above spurious signals may give rise to errors in the above phase modulated waveform.

It is therefore an object of the present invention to provide a code conversion circuit of the above type wherein spurious signals are excluded from the phase modulated waveform generated at the output of the above logical circuit.

It is to be remarked that a code conversion circuit which provides a phase modulated waveform without spurious signals as defined above, is disclosed in Belgian Patent 494,234; this circuit is composed of tubes and includes differentiation means. Although differentiator means compatibly adapted for use in tube circuits are well known in the art, such differentiator means cannot easily be realized in a transistor circuit.

It is therefore a main object of the present invention, to which all of the above objects are ancillary, to provide a code conversion circuit of the above type wherein no use is made of differentiating means and which is thus equally compatible for use with both tubes and transistors.

The present pulse code conversion circuit is characterized by the fact that it provides the conversion effect of the Boolean function $AB+A'B'$, without the associated spurious effects, by applying the Boolean function $ABD+A'B'D+C$ wherein C is a first correction waveform which is normally at said first level but which is at said second level during the intervals overlapping said level changes in one sense of said first information waveform, and wherein D is a second correction waveform which is normally at said second level but which is at said first level during the intervals overlapping said level changes in said other sense of said first information waveform.

The above mentioned and other objects and features of the invention will become more apparent and the invention itself will be best understood by referring to the following description of an embodiment taken in conjunction with the accompanying drawings in which.

Figure 1:
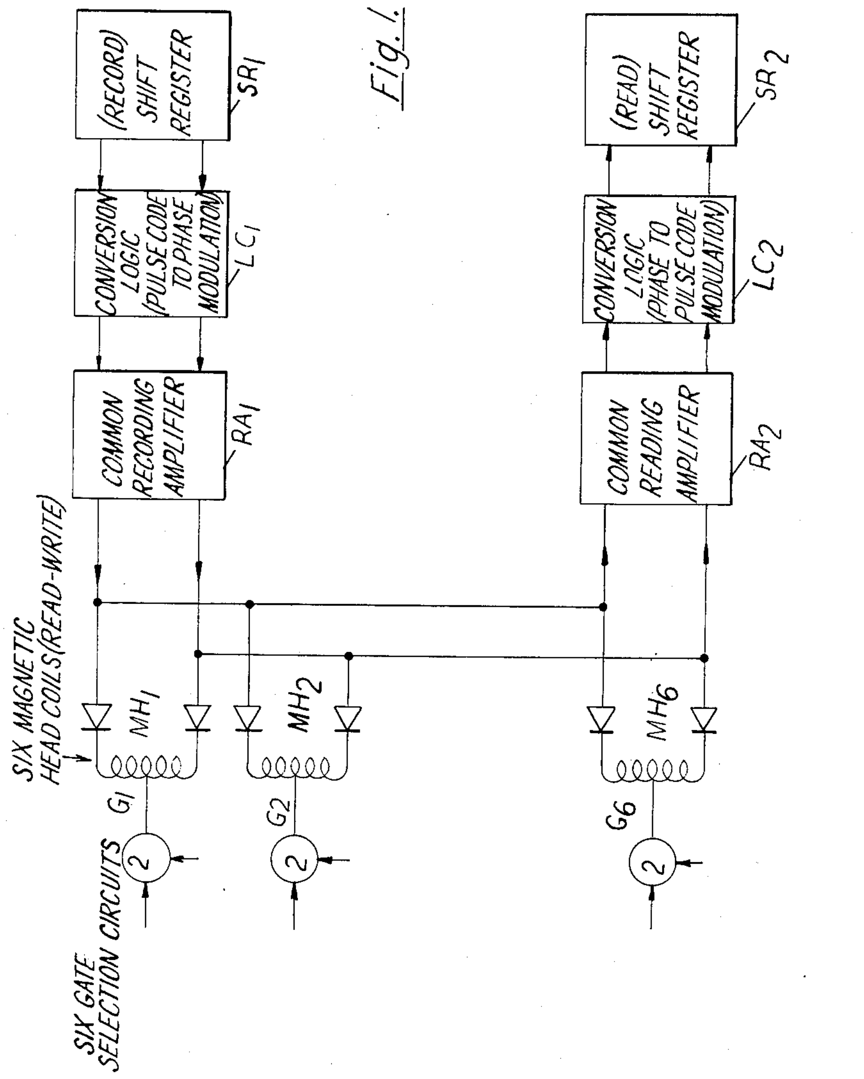
FIG. 1 represents a reading and recording arrangement.

Principally referring to FIG. 1 there is shown a reading and a recording arrangement which includes a number of read-write magnetic head coils $MH_{1-6}$ each having a central tapping and two outer terminals. This arrangement further includes selecting means constituted by a number of two-input coincidence gates $G_{1-6}$ which may for instance be arranged in a matrix. The output of each of these gates is connected to the central tap of a correspondingly numbered one of the above magnetic head coils via an emitter follower (not shown); e.g. the output lead of the two-input coincidence gate $G_1$ is connected to the central tapping of the magnetic head coil $MH_1$ via a not shown emitter follower. The outer terminals of the above magnetic head coils are each connected to the cathode of a diode rectifier the anode of which is connected to the output of a common recording amplifier $RA_1$ and to the input of a common reading amplifier $RA_2$.

It should be remarked that a reading and writing arrangement wherein the coils of the magnetic heads each have a central tapping and two outer terminals and wherein the central tappings are connected to selecting means, whereas the outer terminals are coupled to a reading and writing amplifier via a diode, is shown in the Belgian Patent 558,988. In this arrangement there is however not provided a common reading amplifier and a common writing amplifier, and the selecting means are rather complicated.

The present arrangement further includes a write shift register $SR_1$ wherein the information waveform, hereinafter called A, which is to be encoded on a magnetic medium, e.g. a magnetic drum, is stored in telegraphic pulse code form i.e. the information waveform A varies between first and second levels representing binary 0 and 1 respectively. In order to be able to record the information waveform A in phase modulated form, a logic circuit $LC_1$ is interposed between the output of the above shift register $SR_1$ and the input of the above recording amplifier $RA_1$. By means of this logical circuit the waveform A is converted into a phase modulated waveform prior to recording. This logical circuit will further be described in detail below.

The arrangement further includes a read shift register $SR_2$, which may however be eliminated by time sharing of the above shift register $SR_1$, in the usual manner. Register $SR_2$ is used to store in telegraphic pulse code form the information read from the above magnetic drum. It is clear that the information recorded in phase modulated form, must be converted into a pulse code type of waveform in order to be able to transfer and store it in the above shift register $SR_2$. Therefore another logic circuit $LC_2$ has been interposed between the output of the reading amplifier $RA_2$ and the input of the shift register $SR_2$. This logic circuit is adapted to transform a phase modulated waveform into a waveform of the telegraphic pulse code type, and it will further be described in detail below.

When a reading or writing operation is to be executed, it is necessary to select a particular one of the above magnetic heads $MH_{1-6}$; e.g. $MH_1$. For this it is sufficient to activate the output of the two-input coincidence gate ($G_1$) coupled to the central tap of the magnetic head coil, since the potenial thus applied to that central tap is sufficient to bias both of the diodes connected to the outer terminals of the said coil in the conductive sense. It should be remarked that the other non-selected magnetic heads cannot disturb the reading or writing operation executed by means of the selected magnetic head, since current flow through the coils constituting these non-selected heads is blocked, the diodes associated to each of the latter heads being all biassed in the non conductive sense.

Figure 2:
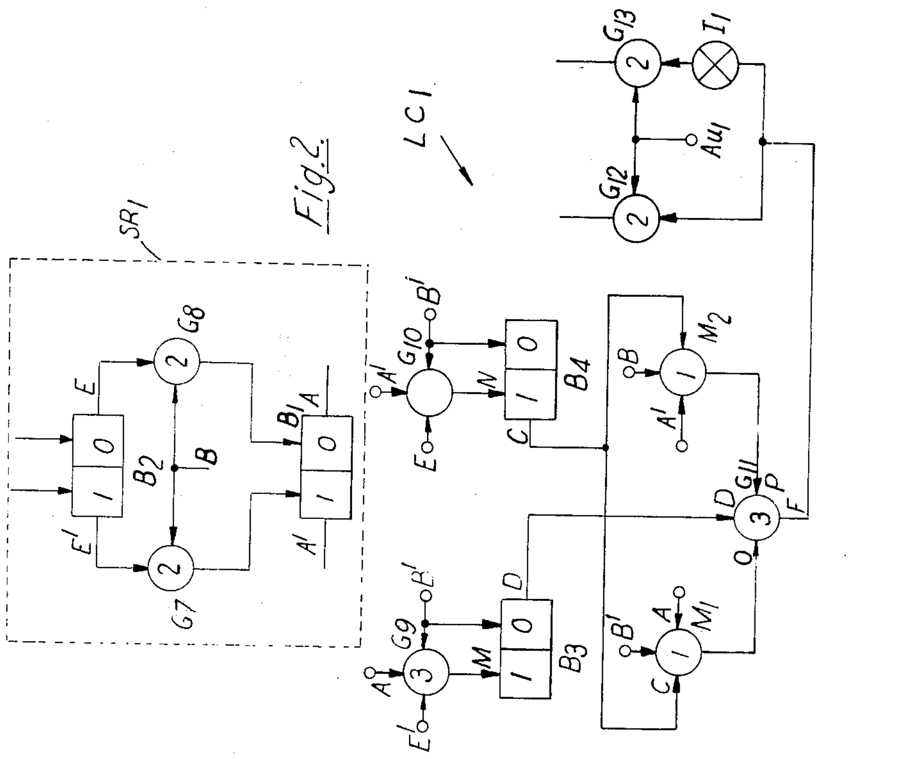
FIG. 2 shows the logical circuit according to the invention.
Figure 3:
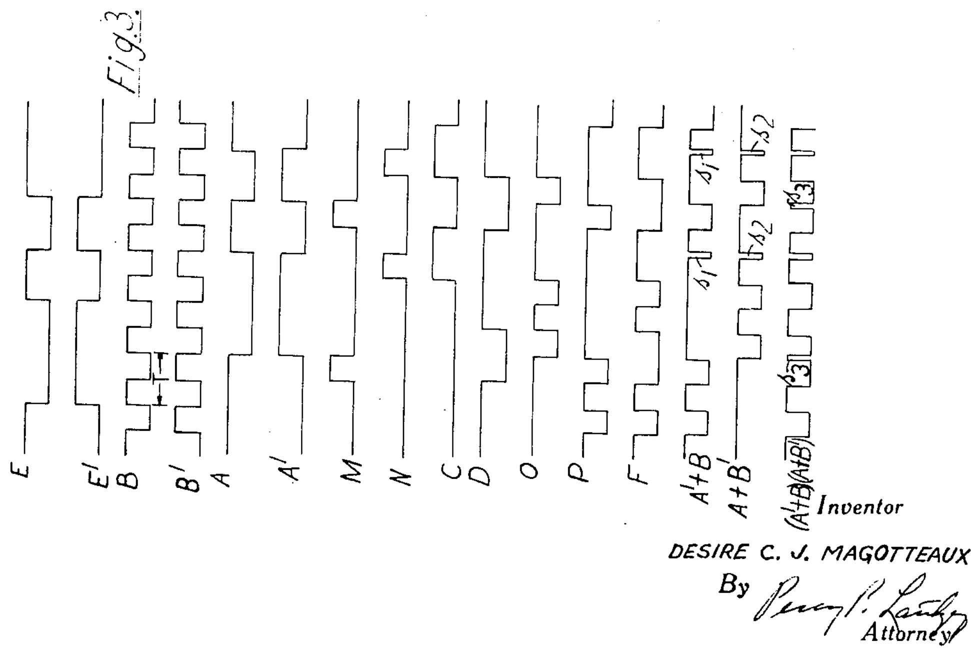
FIG. 3 represents different waveforms appearing at different points of said logical circuit.

Reference is had to FIGS. 2 and 3 for an explanation of the construction and operation of a logical circuit $LC_1$, for converting a waveform A, stored in telegraphic pulse code form in the shift register $SR_1$, into a phase modulated waveform, suitable for recording on a magnetic drum. The above shift register $SR_1$ comprises a series of bistable devices only the last and last-but-one of which, namely $B_1$ and $B_2$, have been shown in FIG. 2. The 1- and 0-outputs of the bistable device $B_2$ are respectively coupled to the 1 and 0-inputs of the bistable device $B_1$, via the two-input coincidence gates $G_7$ and $G_8$ which have a common input connection to the output of a source (not shown) which generates the synchronizing pulse waveform B represented in FIG. 3, only the leading edges of which are effective to control the state of device $B_1$. The waveform A appears at the 0 output of the bistable device $B_1$ whereas the inverse waveform A′ appears at the 1-output of device $B_1$. Both waveforms, A and A′, are shown in FIG. 3.

It should be remarked that the above Boolean function $ABD+A'B'D+C$ may be expressed in a number of equivalent forms; e.g. $(AB+A'B'+C)D$ or $$(A+B'+C)(A'+B+C)D$$

the implementation of which yield identical results.

It should be noted that the waveform B′ is the inverse of the synchronizing waveform B and may be obtained from the latter by passing it through an inverter.

In the following description, the above Boolean function is applied in the form $(A+B'+C)(A'+B+C)D$ which is analogous, in application, to the form $$(A+B')(A'+B)$$

but without the disadvantage, as previously stated, of permitting the passage of spurious signals. Indeed, from FIG. 3 showing the waveforms $A,A'$, $B,B'$, $A+B'$ and $A'+B$, it should be clear that spurious signals might appear at the outputs of mixers through which the latter sums are derived, at time positions corresponding to the variations of the information waveform A from 0 to 1, if, at these time positions, the waveform A varies in a sense opposite to the sense of variation of the waveform B. At the output of a gate used to derive the product $(A+B')$ $(A'+B)$ further spurious signals might appear in coincidence with the variations of the information waveform A from 1 to 0, if at the times of these variations the waveforms $A+B'$ and $A'+B$ are varying in opposite senses, with a resultant spurious transient in the product.

Considering the above sum waveforms $A+B'$ and $A'+B$, it may be noted that spurious signals may be prevented from appearing at the outputs of the above mixers by maintaining these outputs at the 1-level during the intervals overlapping the changes of the information waveform from 0 to 1. Therefore it is sufficient to mix the signals A,B′ as well as A′,B with a waveform, hereinafter called correction waveform C, which is normally at the 0-level but which is at the 1-level during the said overlapping intervals.

Considering further the product waveform $(A+B')(A'+B)$, it may be noted that spurious signals which arise in time coincidence with the changes of the information waveform from 1 to 0, may be prevented from appearing at the output, of the associated coincidence gate through which the product is derived, by maintaining the output of that gate at the 0-level during the intervals overlapping these changes. Therefore it is sufficient to gate the product of waveforms $A+B'$ and $A'+B$ with a waveform, hereinafter called correction waveform D, which is normally at the 1-level but which is at the 0-level during the last-mentioned intervals.

The above correction waveforms C and D may now be generated in the following manner.

The waveforms appearing at the 0- and 1-outputs of the bistable device $B_2$ are called E and E′ respectively, these waveforms being identical to the waveforms A and A′ but advanced by one period T of the synchronizing waveform with respect to the latter waveforms. The waveforms A′, E and B′ are applied to the inputs of a three-input coincidence gate $G_{10}$, the output of which is connected to the 1-input of a bistable device $B_4$, the 0-input of which is conditioned by the above synchronizing waveform B′. The waveform N appearing at the output of the gate $G_{10}$ has the form shown in FIG. 3 i.e. it is normally at the 0-level but it is at the 1-level during the intervals immediately preceding the transitions of waveform A from 1 to 0.

Since the bistable device $B_4$ is normally in its 0-condition the waveform B′ applied to the 0-input of this bistable device cannot modify this condition. This bistable device $B_4$ can only be brought to its 1-condition by a leading edge of the waveform N and it then remains in this condition until it is brought back to the 0-condition by a leading edge of the synchronizing waveform B′. In this manner, the above correction waveform C shown in FIG. 3 is generated at the 1-output of the bistable device $B_4$.

In an analogous manner the above correction waveform D is produced at the 0-output of the bistable device $B_3$, to the 0- and 1-inputs of which are respectively applied the synchronizing waveform B′ and the waveform M, appearing at the output of a three-input coincidence gate $G_9$, to the inputs of which are applied the waveforms A, E′ and B′.

The above obtained correction waveform C is then applied to an input of each of two three-input mixers $M_1$ and $M_2$, to the other inputs of which are respectively applied the waveforms A,B′ and A′,B. The outputs of mixers $M_1$ and $M_2$ are applied to a first and a second input of a three-input coincidence gate $G_{11}$, the third input of which is conditioned by the above correction waveform D. In this manner the phase modulated waveform F, shown in FIG. 3, without spurious signals, appears at the output of this coincidence gate $G_{11}$.

The output of the above coincidence gate $G_{11}$ is connected to one input of a two-input coincidence gate $G_{12}$ and to one input of a two-input coincidence gate $G_{13}$ via an inverter $I_1$. The other inputs of these gates $G_{12}$ and $G_{13}$ are conditioned by a so-called recording authorization signal $Au_1$. Thus, only when this signal is activated may information be transmitted from the shift register $SR_1$ to the selected magnetic head via the logical circuit $LC_1$ and the recording amplifier $RA_1$.

Figure 4:
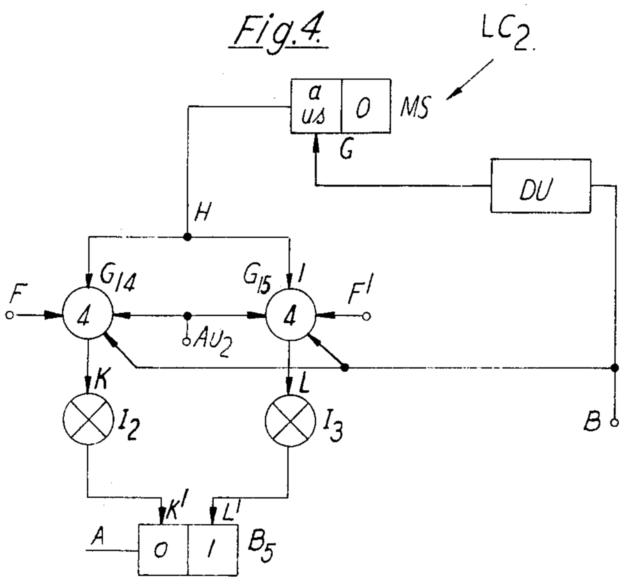
FIG. 4 shows a code conversion logical circuit according to the invention, for converting a phase modulated waveform into a two-level waveform of the type defined above.

Principally referring to the FIGURES 4 and 5 the logical circuit $LC_2$ will now be described for converting a phase modulated waveform, such as represented by F in FIG. 5, into a waveform in telegraphic pulse code form such as represented by A in the same figure.

Figure 5:
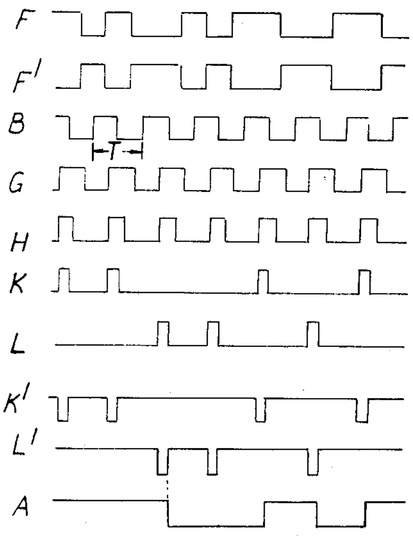
FIG. 5 represents different waveforms appearing at different points of the code conversion circuit of FIG. 4.

This other logical circuit includes a monostable device MS to the 1-input of which is fed, via a delay unit DU, a synchronizing waveform B shown in FIG. 5. The 1-output of this monostable device conditions first inputs of two four-input coincidence gates $G_{14}$ and $G_{15}$, second and third inputs of which are conditioned by a so called reading authorization signal $Au_2$ and by the above synchronizing waveform B respectively. The fourth input of the gate $G_{14}$ is further conditioned by the above phase modulated waveform F, while the fourth input of the gate $G_{15}$ is conditioned by the inverse waveform F'. The outputs of the gates $G_{14}$ and $G_{15}$ are respectively connected to the 0 and 1-inputs of the bistable device $B_5$ via the inverters $I_2$ and $I_3$ respectively.

The waveforms F and B have a relative position such as shown in FIG. 5 and the aim of the circuit comprising the delay unit DU and the monostable device MS is to generate a train of sampling pulses each of which overlaps the trailing edge of synchronizing waveform B.

The delay unit DU shifts the synchronizing waveform B over a predetermined time interval so as to produce the waveform G shown in FIG. 5 and the monostable device MS is then triggered in its unstable condition for "$a$" microseconds by each leading edge of the above waveform G. In this manner a waveform H is generated at the 1-output of this monostable device MS of the form shown in FIG. 5.

When the reading authorization signal has the authorization value equal to 1, the waveforms K and L shown in FIG. 5 will appear at the outputs of the gates $G_{14}$ and $G_{15}$, whereas the waveforms K' and L' will appear at the output of the inverters $I_2$ and $I_3$ respectively.

When applying the waveforms K' and L' to the bistable device $B_5$, a waveform A, rising and falling in coincidence with lagging edges of the respective waveforms K and L, will appear at the 0-output thereof.

It should be remarked that only when the above reading authorization signal is activated may information be transmitted from a selected magnetic head to the shift register $SR_2$ via the logical circuit $LC_2$ and the reading amplifier $RA_2$.

Due to the mutually exclusive nature of the above reading and recording authorization signals it is obvious that a reading operation will never disturb a recording operation and vice-versa.

While the principles of the invention have been described above in connection with specific apparatus, it is to be clearly understood that this description is made only by way of example and not as a limitation on the scope of the invention.

I claim:

1. A circuit for converting a pulse code modulated signal into a phase modulated signal comprising:

(a) a source of pulse code modulated signals E, (b) a source of periodic reference timing signals B, (c) means coupled to said sources for producing a pulse code signal A identical in form to the said signal E but delayed therefrom by one period (T) of the said periodic signal B, (d) means coupled to said sources for producing signals representative of the application of the Boolean function $AB+A'B'$ to the said signals A and B, where A' and B' are the respective inverses of the said signals A and B, (e) means coupled to said sources and to said first-named means for performing a predetermined logic operation on the said signals A, B, and E to produce correction gating signals the durations of which overlap the level transitions of said signal A, and (f) means for gating the said signals representative of the function $AB+A'B'$ under the control of said correction gating signals.

2. A circuit according to claim 1 wherein:

(a) the said means for producing the signal A includes a shift register through which the said signal E is advanced in synchronism with the leading edges of the said signals B, and wherein (b) the said correction gating signal producing means includes:

(c) a first bistable device $B_3$ having a 0-input conditioned by the leading edge of the said timing signal B' and a 0-output representative of the said signal D, (d) a second bistable device $B_4$ having a 0-input conditioned by the leading edge of the said signal B' and a 1-output representative of the said signal C, (e) a first gating circuit for producing a signal representative of the application of the Boolean function $AB'E'$ to the signals A, B and E where E' is the inverse of E, (f) a second gating circuit for producing a signal representative of the application of the Boolean function $A'B'E$ to the signals A, B and E, (g) and means connecting the outputs of said first and second gating circuits to the respective 1-inputs of said first and second bistable devices.

3. A circuit according to claim 1 wherein the said correction gating signals include:

(a) a first train of pulse signals C, the durations of which overlap the said level transitions of said signal A in a first sense, and (b) a second train of pulse signals D, the durations of which overlap the said level transitions of said signal A in the sense opposite to said first sense.

4. A circuit according to claim 3 wherein:

(a) the signals C are applied in an enabling sense to said gating means, and (b) the said signals D are applied in an inhibitory sense to the said gating means.

5. A circuit according to claim 3 wherein:

(a) the said means for producing signals representative of said function $AB+A'B'$ comprises:

(b) a first three-input mixer $M_1$ to the inputs of which are applied the said signals A, B', and C, and (c) a second three-input mixer to the inputs of which are applied the said signals A'B and C, (d) and wherein the said means for gating comprises (e) a three-input coincidence gate to the inputs of which are applied the outputs of said first and second three-input mixers, and the said signal D, (f) a first two-input coincidence gate having inputs coupled to the output of said three-input coincidence gate and a source of recording authorization signals (g) an inverting circuit coupled to the output of said three-input coincidence gate, and (h) a second two-input coincidence gate having inputs coupled to the outputs of said inverting circuit and to said source of recording authorization signals.

6. A circuit for converting signals recorded in two level phase modulated form to corresponding two level signals in pulse code form comprising:

(a) a source of two level periodic reference timing pulse signals B (b) a source of two-level phase modulated signals F having level transitions occurring in predetermined time relation to the leading edges of corresponding ones of said pulses B, (c) means coupled to said source B for producing corresponding reference timing pulses H which have the same periods but shorter durations then said pulses B, and which are timed to occur out of synchronism with the level transitions of said signal F, (d) first means coupled to said sources and to said reference-timing-pulse producing means for producing signals representative of the application of the inverse of the Boolean function *BHF* to said signals B, H, and F, (e) second means coupled to said sources and to said reference-timing-pulse producing means for producing signals representative of the application of the inverse of the Boolean function *BHF'* to the signals B, H, and F, where F' is the inverse of the signal F, and (f) bistable storage means having opposed inputs connected to the outputs of said first and second signal producing means.

References Cited by the Examiner

UNITED STATES PATENTS

| | | | |
|---|---|---|---|
| 2,700,155 | 1/55 | Clayden | 340—174.1 |
| 2,764,463 | 9/56 | Lubkin et al. | 340—174.1 |
| 2,807,004 | 9/57 | Pouliart et al. | 340—174.1 |
| 2,882,518 | 4/59 | Buhrendorf | 240—174.1 |

IRVING L. SRAGOW, *Primary Examiner.*